United States Patent
Ishibashi et al.

(10) Patent No.: US 11,993,120 B2
(45) Date of Patent: May 28, 2024

(54) UTILITY VEHICLE

(71) Applicants: KAWASAKI MOTORS, LTD., Akashi (JP); ROBERT BOSCH GmbH, Stuttgart (DE)

(72) Inventors: Yuta Ishibashi, Akashi (JP); Shintarou Nakamura, Akashi (JP); Ryo Nishio, Akashi (JP); Makoto Masuda, Yokohama (JP)

(73) Assignees: KAWASAKI MOTORS, LTD., Akashi (JP); ROBERT BOSCH GMBH, Stuttgart (DE)

( * ) Notice: Subject to any disclaimer, the term of this patent is extended or adjusted under 35 U.S.C. 154(b) by 169 days.

(21) Appl. No.: 17/807,103

(22) Filed: Jun. 15, 2022

(65) Prior Publication Data

US 2023/0406058 A1 Dec. 21, 2023

(51) Int. Cl.
*B60G 17/0165* (2006.01)

(52) U.S. Cl.
CPC .... *B60G 17/0165* (2013.01); *B60G 2400/204* (2013.01); *B60G 2400/821* (2013.01); *B60G 2600/184* (2013.01)

(58) Field of Classification Search
CPC .............. B60G 17/0165; B60G 17/018; B60G 2400/204; B60G 2400/821; B60G 2600/184; B60G 2600/20; B60G 2500/10
USPC .......................................................... 701/37
See application file for complete search history.

(56) References Cited

U.S. PATENT DOCUMENTS

| | | | | |
|---|---|---|---|---|
| 4,722,546 A | * | 2/1988 | Asami ................ | B60G 17/0165 280/5.517 |
| 8,613,336 B2 | * | 12/2013 | Deckard ................ | B60K 17/08 180/68.3 |
| 11,413,923 B2 | * | 8/2022 | Ishibashi ............ | B60G 17/0164 |
| 2021/0276388 A1 | | 9/2021 | Ishibashi et al. | |

* cited by examiner

*Primary Examiner* — Hai H Huynh
(74) *Attorney, Agent, or Firm* — Fay Kaplun & Marcin, LLP (57) ABSTRACT

A utility vehicle includes an electronically controlled vehicle behavior adjuster, an intention detector, and a controller. The electronically controlled vehicle behavior adjuster is capable of modifying response characteristics of behavior of the vehicle. The intention detector detects at least one of intentions of an operator of moving the vehicle. When an operator's intention of moving the vehicle is detected by the intention detector, the controller changes the response characteristics of the behavior of the vehicle compared to when an intention of the operator of moving the vehicle is not detected by the intention detector.

14 Claims, 5 Drawing Sheets

UTILITY VEHICLE

TECHNICAL FIELD

The present disclosure relates to control of response characteristics of behavior of a utility vehicle.

BACKGROUND ART

There are known utility vehicles equipped with one or more vehicle behavior adjusters. The vehicle behavior adjusters act on the vehicle behavior generated in response to inputs from the surface of the road. Such adjusters include, for example, suspension and stabilizers.

Recently, utility vehicles wherein the performance characteristics of the vehicle behavior adjusters can be electronically controlled have been proposed. For example, as described in U.S. Patent Publication Serial Number US 2021/0276388, there are some utility vehicles wherein, while they are in motion, their setting can be changed by an operator, with respect to performance of the suspension and the other parts.

SUMMARY OF THE INVENTION

According to a first aspect of the present disclosure, a utility vehicle with a configuration described below is provided. That is, the utility vehicle includes an electronically controlled vehicle behavior adjuster, an intention detector, and a controller. The electronically controlled vehicle behavior adjuster is capable of modifying response characteristics of the vehicle behavior. The said intention detector detects at least one of intentions of an operator of moving the vehicle. When an operator's intention of moving the vehicle is detected by the intention detector, the controller changes the response characteristics of the vehicle behavior compared to when an intention of the operator of moving the vehicle is not detected by the intention detector.

This allows changing the response characteristics of the vehicle behavior into that which is appropriate for the vehicle to start moving with an operator's intention of moving the vehicle being detected. In other words, as long as any intention of moving the vehicle of an operator is not detected, the response characteristics of the vehicle behavior is prevented from changing into that which is appropriate for the vehicle to start moving. Thus, an unintentional change in the characteristics of the vehicle behavior while an operator is in the vehicle without any intentions of moving it is prevented, since an intention of the operator of moving the vehicle needs to be detected to change the response characteristics of the vehicle behavior. In addition, the response characteristics of the vehicle behavior can be determined differently, one appropriate for a state of the vehicle before starting to move, that is, in which it is not in motion, and one appropriate for it to start to move. Thus, the response characteristics of the vehicle behavior can easily be adjusted according to each situation. Furthermore, since the change in the response characteristics of the vehicle behavior is conditional on the detection of an intention of moving the vehicle, the response characteristics of the vehicle behavior can easily be changed into that which is appropriate for the vehicle to start moving before the vehicle actually starts to move. In this manner, the utility vehicle, wherein the response characteristics of the behavior according to each situation can be obtained, can be provided.

According to a second aspect of the present disclosure, a utility vehicle with a configuration described below is provided. That is, the utility vehicle includes an electronically controlled vehicle behavior adjuster, a sensor, and a computer. The sensor detects at least one of intentions of an operator of moving the vehicle. When the intention of the operator of moving the vehicle is detected by the sensor, the computer changes the response characteristics of the vehicle behavior, through the operation of the vehicle behavior adjuster, compared to when any intention of an operator of moving the vehicle is not detected by the sensor.

This allows changing the response characteristics of the vehicle behavior into that which is appropriate for the vehicle to start moving when an operator's intention of moving the vehicle is detected. In other words, as long as any intention of the operator of moving the vehicle is not detected, the response characteristics of the vehicle behavior is prevented from changing into that which is appropriate for the vehicle to start moving. Thus, an unintentional change in the characteristics of the vehicle behavior is prevented while an operator is in the vehicle without any intentions of moving it, since an intention of the operator of moving the vehicle needs to be detected to change the response characteristics of the vehicle behavior. In addition, since the response characteristics of the vehicle behavior can be determined differently, one appropriate while it is not in motion and one appropriate when it stars to move, the response characteristics of the vehicle behavior can easily be adjusted according to each situation. Furthermore, since the change in the response characteristics of the vehicle behavior is conditional on the detection of an intention of moving the vehicle, the response characteristics of the vehicle behavior can easily be changed into that which is appropriate for staring to move before the vehicle actually starts to move. In this manner, the utility vehicle, wherein the response characteristics of the behavior according to each situation can be obtained, can be provided.

According to a third aspect of the present disclosure, a utility vehicle with a configuration described below is provided. That is, the utility vehicle includes an electronically controlled vehicle behavior adjuster, a sensor, a mode switch, and a computer. The electronically controlled vehicle behavior adjuster can operate in more than one mode with different response characteristics of the vehicle. The sensor detects a predetermined specific operation of the operator performed after an ignition operation wherein an operation supplying electric power to electrical components of the vehicle is detected. The mode switch is operated to select one of the said modes of the vehicle behavior adjuster. The computer controls the vehicle behavior adjuster so that it operates in the mode selected by operating the mode switch while the vehicle is in motion. The computer controls the vehicle behavior adjuster so that it operates according to the mode selected by the mode switch when the said predetermined specific operation is detected by the sensor while the vehicle is determined to be not in motion.

This allows changing the response characteristics of the vehicle behavior according to the mode selected by the mode switch in a particular situation in which the vehicle is determined to be not in motion and a specific operation of the driver is detected. The vehicle behavior being changed exclusively in such a particular situation allows a person such as a prospective purchaser to actually experience how they feels the vehicle behavior in each mode of the vehicle behavior adjuster even though the vehicle is not in motion. In this manner, the utility vehicle, wherein the response characteristics of the behavior according to each situation can be obtained, can be provided.

The present disclosure relates to changing response characteristics of the vehicle behavior appropriate for each situation depending on whether there is an operator's intention of moving the vehicle or not.

EMBODIMENT FOR CARRYING OUT THE INVENTION

Figure 1:
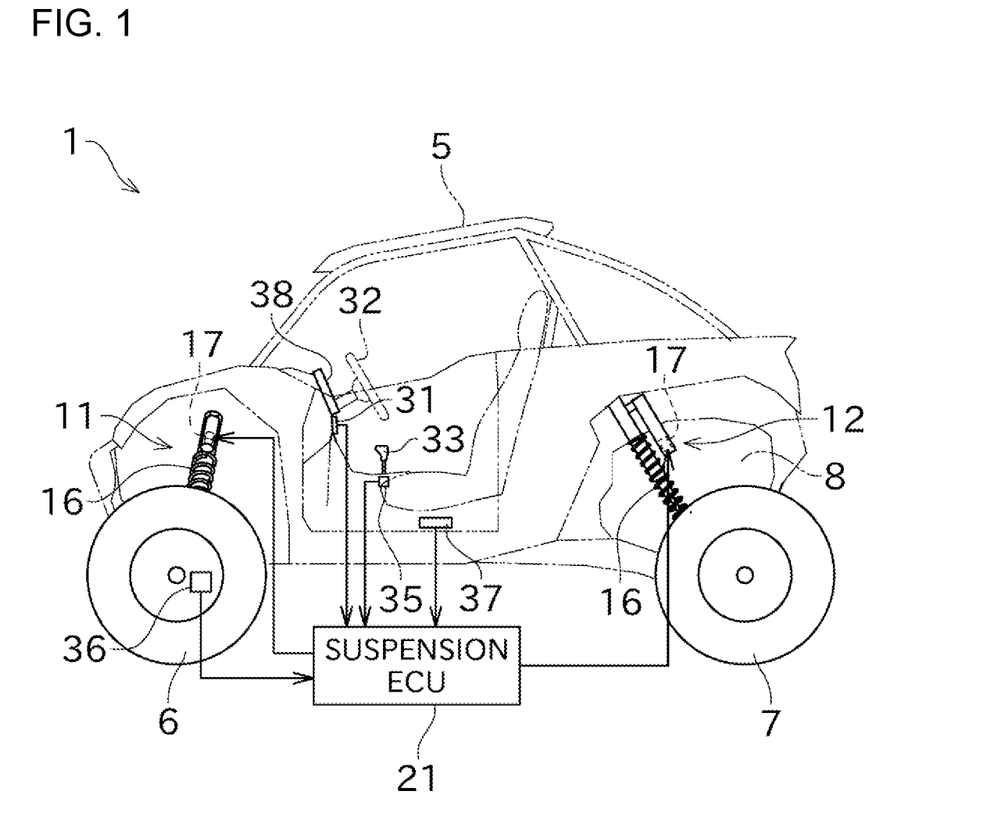
FIG. 1 is a schematic illustration illustrating the overall configuration of a utility vehicle according to one embodiment of the present disclosure.

Embodiments of the present disclosure will be described below with reference of the drawings. FIG. 1 is a schematic illustration showing the overall configuration of a utility vehicle 1 according to one embodiment of the present disclosure.

The utility vehicle 1 of the present embodiment is a sport off-road four-wheeled vehicle. The utility vehicle 1 includes a vehicle body 5, a pair of front wheels 6 and a pair of rear wheels 7.

The utility vehicle 1 may be used for various purposes. Specifically, the utility vehicle 1 may be used for leisure activities such as a driving sport in which players enjoy driving on, for example, rocks, sand, uneven roads, swamps, winding roads. Such leisure activities also include a trekking in a forest enjoying a landscape. The utility vehicle 1 may also be used for agricultural purposes, such as spreading fertilizer, watering, and applying pesticide on a farm.

The utility vehicle 1 is equipped with low-pressure tires. Low pressure tires are also referred to as balloon tires. A low-pressure tire is filled with air at relatively low pressure, e.g., 300 kPa or less, specifically about 200 kPa. Being filled with air at such low pressure, it is easier for a low-pressure tire to have a larger contact area and to have better grip on unsurfaced roads than a high-pressure tire.

The utility vehicle 1 may include a bed for carrying loads. The utility vehicle 1 may also include a known rollover protection system such as a ROPS. ROPS stands for Roll-Over Protection Structure.

The utility vehicle 1 may preferably have a configuration wherein the user can choose which wheels to be driven by the engine for driving on uneven roads. Such configurations include, for example, one wherein the vehicle can shift between 2-wheel drive and 4-wheel drive and one wherein the vehicle can lock and unlock its differentials.

An engine 8 is supported within the vehicle body 5. Driving force generated by the engine 8 is changed in speed and transmitted to the rear wheels 7 by a transmission which is not shown in the drawings. This allows the utility vehicle 1 to move. By an operation of the operator, the driving force of the engine 8 can be transmitted to the front wheels 6 as well as to the rear wheels 7.

Though it is not shown in the drawings, the utility vehicle 1 includes a pair of front shock-absorbers installed on right and left sides of the vehicle, and more specifically, referred to as front suspension arms, and a pair of rear shock-absorbers installed on right and left sides of the vehicle, and more specifically, referred to rear suspension arms. Each of the front wheels 6 on right and left side of the vehicle is supported by the corresponding front suspension arm within the vehicle body 5. Each of the rear wheels 7 on right and left side of the vehicle is supported by the corresponding rear suspension arm within the vehicle body 5.

The front suspension arms and the rear suspension arms are configured to be able to swing in the vertical direction. Thus, each of the four wheels, that is, the front wheels 6 and the rear wheels 7, can move in the vertical direction with respect to the vehicle body 5.

The utility vehicle 1 includes a pair of right and left front suspension units 11 and a pair of right and left rear suspension units 12. A suspension unit can also be referred to as a shock absorber. The front suspension units 11 and the rear suspension units 12 are examples of vehicle behavior adjusters and are also examples of vehicle behavior adjusting devices.

Each of the front suspension units 11 is arranged to connect the vehicle body 5 and the corresponding front suspension arm. The front suspension units 11 absorb shocks that caused by bumps on the road and received by the front wheels 6. Each of the rear suspension units 12 is arranged to connect the vehicle body 5 and the corresponding rear suspension arm. The rear suspension units 12 absorb shocks that caused by bumps on the road and received by the rear wheels 7. Within the present embodiment, the suspension units of the vehicle are separate from each other. This allows the right and left wheels to move separately from each other in the vertical direction. Each of the four suspension units, that is, the front suspension units 11 and the rear suspension units 12, is configured as a known electronically controlled suspension. Within the utility vehicle 1 of the present embodiment, adopting electronically controlled suspension allows separate control of the expansion and connection characteristics (such as the characteristics of damping, spring, and stroke amounts).

The utility vehicle 1 includes a suspension ECU 21. ECU stands for Electronic Control Unit. The suspension ECU 21 is an example of the controller. The suspension ECU is configured as a computer and includes a CPU, a ROM, and a RAM. The suspension ECU 21 is electrically connected to the front suspension units 11 and the rear suspension units 12. The suspension ECU 21 electronically controls the front suspension units 11 and the rear suspension units 12.

All of the four suspension units, that is, the front suspension units 11 and the rear suspension units 12 have substantially same configurations. The configuration of the left rear suspension unit 12 will be described below as a representative of the four.

Since the configurations of these suspension units are publicly known, the description below may be brief. The left rear suspension unit 12 includes two tubes coupled to each other. The two tubes can slide with respect to each other. The two tubes move relative to each other as the left rear wheel 7 moves up and down, thus the length of the rear suspension unit 12 changes.

A spring 16 is installed to connect the two tubes. An oil chamber filled with oil, which is not shown in the drawings, is formed inside the two tubes. When the two tubes move relative to each other, the spring 16 expands or contracts. At the same time, the oil in the oil chamber flows through a channel which is not shown in the drawings. In this manner, damping force is provided with respect to the movement of the tubes, thereby the speed of the vertical movement of the rear wheel 7 relative to the vehicle body 5 can be reduced. As a result, shocks and vibrations caused by bumps of the road and received by the rear wheel 7 while the vehicle is in motion can be absorbed. The oil channel within the rear suspension unit 12 can be referred to as a damping force generator.

A solenoid valve 17 is arranged in the oil channel. The solenoid valve 17 is an electric actuator that can change the degree of obstruction of the flow of the oil flowing through the oil channel.

The solenoid valve 17 includes a solenoid that has a publicly known configuration. This solenoid includes a coil part (magnetic field generating element) consists of an electrical wire wound in order to function as an electromagnet. When an electric current passes though the coil part, the coil part generates a magnetic field and magnetic force moves a movable iron plunger. Within the rear suspension unit 12, the solenoid valve 17 operates according to electrical signals sent by the suspension ECU 21, as described below, and adjusts the ease of the flow of the oil (i.e. the magnitude of flow resistance) through the oil channel. The easier the oil flows within the solenoid valve (i.e. the lower the flow resistance is), the weaker the damping force against the expansion and contraction of the suspension. In this manner, the damping force generated by the rear suspension unit 12 can be adjusted.

Though they are not shown in the drawings, the solenoid valve 17 includes a movable iron plunger and a spring. The movable iron plunger is arranged to be movable back and forth at a predetermined stroke. The spring biases the movable iron plunger toward a first end of the valve with respect to the direction of its movement. The magnetic force, whose direction is opposite to the direction of the biasing force of the spring, is generated by the solenoid and acts on the movable iron plunger so that a disc moves together with the iron plunger toward a second end of the valve with respect to the direction of the movement. In this manner, the magnitude of the damping force can be adjusted according to the position of the movable iron plunger.

Within this configuration, in order to keep the disc in a different position form the first end of the valve with respect to the direction of its movement, the current must continuously pass through the solenoid to keep it generating the magnetic force against the biasing force of the spring. The longer the distance between the position where the disc is held and the first end of the valve, the greater the biasing force generated by the spring is, so the larger current needs to continuously pass through the solenoid to hold the disc in a position farther away from the first end of the valve.

Within the solenoid valve 17 of the present disclosure, the disc can be controlled to be held in a position selected from predetermined positions by changing the magnitude of the current supplied to the solenoid by predetermined degrees. This allows the flow resistance of the oil in the damping force generator to be changed stage by stage.

Although the above description is that of the rear suspension units 12, each of the front suspension units 11 also includes a solenoid valve 17. Each of the solenoid valves 17 of the front suspension units 11 can change the flow resistance of the oil in a channel, that is, a damping force generator, stage by stage. The number of stages that the flow resistance can be changed in may be equal to the number of modes described below, or may be larger than that.

The suspension ECU 21 can control the front suspension units 11 and the rear suspension units 12 switching their modes between three modes: a first mode, a second mode, and a third mode.

The first mode is a low damping mode that has the lowest flow resistance of the three modes. In the first mode, the solenoid valves 17 are controlled in order to lower the flow resistance of the oil channels relatively within the front suspension units 11 and the rear suspension units 12. For example, in the first mode, the expanding and contracting motions of the springs cease relatively slowly because the amount of damping is lower than that in the other modes. This allows the vertical impacts caused when the vehicle goes over bumps on the road to be mitigated when they are transmitted to the driver. The first mode may be referred to, for example, as a soft mode and may be configured as a mode that emphasizes the ride comfort on flat roads.

The second mode is a high damping mode that has the highest flow resistance of the three modes. In the second mode, the solenoid valves 17 are controlled in order to increase the flow resistance of the oil channels relatively within the front suspension units 11 and the rear suspension units 12. For example, in the second mode, the expanding and contracting motions of the springs cease relatively quickly because the amount of damping is higher than that in the other modes. In this manner, the vertical oscillations of the vehicle after going over bumps on the road can be prevented from lasting long. The second mode may be referred to, for example, as a firm mode and may be configured as a mode that emphasizes the convergence of the oscillations on roads with continuous unevenness. The second mode may also be configured as a mode that emphasizes the advanced driving performance, such as having a larger contact area with the road when moving at high speeds, required in a driving sport.

The third mode is a medium damping mode that has the midrange flow resistance in the three modes. In the third mode, the solenoid valves 17 are controlled in order to adjust the flow resistance of the oil channels within the front suspension units 11 and the rear suspension units 12 to be intermediate between that in the other modes. For example, in the third mode, since the amount of damping is set in the middle compared to that in the other modes, the mode may be adjusted to provide a balanced distribution between the degree of absorbing the vertical shocks and the speed of convergence of the vertical oscillations. The third mode may also be referred to, for example, as a normal mode and may be configured as a mode suitable for driving on both flat and uneven roads.

In these three modes, a parameter may be set to achieve desired behavior according to each mode based on the conditions while driving including, without limitation, a speed, a vehicle attitude, a loaded quantity, a condition of road surface, a stroke length of the shock absorbers, an amount of steering, acceleration, deceleration, and a braking operation, as well as the amount of damping is different in each mode. For example, assuming that the conditions while driving are the same, it is preferable that the three modes are expressed as a low damping mode, a high damping mode, and a medium damping mode. Although there are three modes configured within the present embodiment, the number of modes configured may be other than three, for example, two, four or more.

Within the present embodiment, the low damping mode corresponds to the state in which the highest current is passed through the solenoids of the solenoid valves 17. The high damping mode corresponds to the state in which no current is passed through the solenoids of the solenoid valves 17. The medium damping mode corresponds to the state in which the current of midrange magnitude compared to that in the low damping mode and the high damping mode is passed through the solenoids of the solenoid valves 17.

A mode selector switch 31 is arranged at a position where an operator seated in the driver's seat can operate it. The mode selector switch 31 is an example of a mode switcher, an example of a mode switcher, and also an example of the mode switch. Within the present embodiment, the mode selector switch 31 is configured as a rotary switch with a knob. The mode selector switch 31 is arranged at a central position between the right and left sides of an instrument panel of the vehicle. The configuration and the arrangement of the mode selector switch 31 may be changed as needed.

The mode selector switch 31 has three positions corresponding to the three modes described above with respect to the front suspension units 11 and the rear suspension units 12. The operator can change the position of the mode selector switch 31 by turning it. The mode selector switch 31 is electrically connected to the suspension ECU 21. By operating the mode selector switch 31, the operator can instruct the suspension ECU 21 on which mode for the front suspension units 11 and the rear suspension units 12 to be operated in.

A steering wheel 32 and a gear stick 33 are arranged at positions where an operator seated in the driver's seat can operate them. The steering wheel 32 is operated by the operator for steering. The gear stick 33 is operated by the operator to change the transmission gear ratio of the utility vehicle 1.

The gear stick 33 has four positions: a low speed position, a high speed position, a neutral position, and a backward position. The transmission of the utility vehicle 1 is configured as a continuously variable transmission with a sub transmission. The operator can change the gear ratio of the sub transmission by operating the gear stick 33.

The sub transmission of the present embodiment has a publicly known sub transmission mechanism with gears. The neutral position corresponds to a state in which none of the gears are engaged within the transmission. When the operator wants the utility vehicle 1 to move, the operator moves the gear stick 33 to one of its position states other than the neutral position, that is, one of three positions out of four positions that the gear stick 33 has. A state in which the gear stick 33 is positioned in one of the positions other than the neutral position may be referred to as "an in-gear state" below. An in-gear state can be detected, for example, by a shift sensor 35 installed to the gear stick 33. For example, a potentiometer can be employed as the shift sensor 35. Since a putting-into-gear operation indicates an operator's intention of moving the vehicle, the shift sensor 35 is an example of the intention detector.

The term "a putting-into-gear operation" shall mean an operation to change the position of the gear stick 33 from the neutral position to another position. Within the present embodiment, the putting-into-gear operation corresponds to the predetermined specific operation. Therefore, the shift sensor 35 is an example of a specific operation detector.

The utility vehicle 1 includes a vehicle speed sensor 36. The vehicle speed sensor 36 can be configured, for example, as a rotation sensor that detects rotations of the front wheels 6 or the rear wheels 7. The speed of the utility vehicle 1 detected by the vehicle speed sensor 36 is inputted to the suspension ECU 21.

The utility vehicle 1 includes an IMU 37. IMU stands for Inertial Measurement Unit. The IMU 37 detects acceleration of the vehicle in three axes, i.e. acceleration forward and backward, rightward and leftward, and upward and downward. The IMU 37 also detects rotational rates of three axis, i.e. pitch, roll, and yaw. The detection results output from the IMU 37 are inputted to the suspension ECU 21.

The suspension ECU 21 compares the speed of the utility vehicle 1 detected by the vehicle speed sensor 36 with a predetermined threshold and performs different processing depending on the result of the comparison. Since a sufficiently small value is set as the threshold, the comparison described above substantially means a determination of whether the vehicle is in motion or not. Within the present embodiment, the threshold is set as 2 km/h, but is not limited to.

When the speed of the utility vehicle 1 exceeds the threshold, the suspension ECU 21 performs normal control for a moving vehicle. Specifically, the suspension ECU 21 performs compound control at least compositely following the control method (1) and (2) described below.

(1) The suspension ECU controls the flow resistance within the damping force generators of the front suspension units 11 and the rear suspension units 12 to gradually increase it as the speed of the vehicle increases. For example, the ratio of the flow resistance increase that occurs as the speed of the vehicle increases may be set to be different in each mode.

(2) The suspension ECU 21 controls in real-time the flow resistance within the damping force generators of the front suspension units 11 and the rear suspension units 12 depending on the attitude and motion of the vehicle (i.e. the acceleration in the three axes and the rotational rates of the three axes) calculated based on the detection results output from the IMU 37. For example, the ration of the flow resistance increase may be set to differ as the vertical vibration increases.

In performing control, while the vehicle is in motion, following (1) and (2) described above, the suspension ECU 21 controls the characteristics of damping force generated within the front suspension units 11 and the rear suspension units 12 in order to change it according to the mode indicated by the operator using the mode selector switch 31. In this manner, the multiple modes regarding the behavior of the vehicle while in motion can be provided. Overall, as described above, when the conditions while the vehicle is moving (such as the speed and the attitude of the vehicle) are the same, the amount of damping tends to decrease in the order of the high damping mode, the medium damping mode, and the low damping mode. Conversely, when the conditions are different from each other, the amount of damping could be higher even in the low damping mode than that in the high damping mode.

When the speed of the utility vehicle 1 is less than the threshold, the suspension ECU 21 determines whether a putting-into-gear operation is performed by the operator according to the shift sensor 35. In other words, under a condition where the vehicle is determined to be not in motion, the ECU determines whether an operation indicating an intention of moving the vehicle is performed.

When no in-gear state is detected, the suspension ECU 21 controls the front suspension units 11 and the rear suspension units 12 in order to reduce the current passing through the solenoids thereof to the lowest level, specifically, to increase the said amount of damping to the maximum. As described above, no current passes through the solenoids in the state of high damping, which is favorable in terms of energy conservation.

When the control unit determines that the utility vehicle 1 is not in motion and an operation indicating an intention of moving the vehicle is detected, specifically, an in-gear state is detected, the suspension ECU 21 changes the response characteristics of the behavior control device, that is, the amount of damping, compared to before the intention of moving the vehicle is detected (i.e. under a condition where vehicle is not in an in-gear state). Specifically, it controls the front suspension units 11 and the rear suspension units 12 according to any of the following two examples.

In a first example, the front suspension units 11 and the rear suspension units 12 are controlled so that they have the lowest amount of damping. As described above, the control changing the amount of damping to the minimum is performed at a time when an operation to start moving the vehicle is performed. This allows improvement in the conformability to the amount of damping set for each mode, compared to the case where the control to the amount of damping is performed after the vehicle actually starts moving. Also, compared to the case where the amount of damping is lowered after the vehicle starts to move, the amount of damping at the beginning of moving can be less incommensurate.

In a second example, the front suspension units 11 and the rear suspension units 12 are controlled so that they have the amount of damping that is set for the mode selected by the mode selector switch 31. For example, when the low damping mode is selected, the amount of damping is set at the minimum. When the medium damping mode is selected, the amount of damping is set between the minimum and the maximum. When the high damping mode is selected, the amount of damping is set at the maximum.

The more detailed description of the first example is below. Consider the case where an operator gets into the utility vehicle 1 stopped on the road and starts the vehicle to move. Within this example, an ignition switch of the utility vehicle 1, which is not shown in the drawings, has been operated in advance and electrical components of the utility vehicle 1 are electrified.

When the operator gets into the utility vehicle 1, the front suspension units 11 and the rear suspension units 12 of the utility vehicle 1 are operating in a state where no current passing through the solenoids, that is, in a state where the amount of damping is at the maximum. When the operator seated in the driver's seat performs a putting-into-gear operation with the gear stick 33, the amount of damping within the front suspension units 11 and the rear suspension units 12 is increased to the minimum under control of the suspension ECU 21. Thereafter, the utility vehicle 1 starts moving when the operator pushes an accelerator pedal, which is not shown in the drawings. When the vehicle starts moving, specifically, when the speed of the vehicle is determined to have exceeded the threshold speed, the suspension ECU 21 controls the front suspension units 11 and the rear suspension units 12 to adjust the amount of damping thereof according to the mode selected.

When the front suspension units 11 and the rear suspension units 12 operates with a relatively low amount of damping, the vehicle behavior responding to external force becomes more drastic compared to when they operates with the high amount of damping. Thus, considering the drive comfort for the operator, it can be said that the low amount of damping is more suitable when the vehicle starts to move.

The operation mode of the front suspension units 11 and the rear suspension units 12 is changed to that with the low amount of damping, which is suitable for the vehicle to start moving, before the operator pushes the accelerator pedal. This allows the improvement of the overall ride quality. The change to the state with the low amount of damping is conditional on that an operator performs a putting-into-gear operation that corresponds to an operator's intention of moving the vehicle. Therefore, unintentional changes in the characteristics of the vehicle behavior are prevented from occurring when the operator doesn't intend to move the vehicle.

Even when the vehicle is not moving, the front suspension units 11 and the rear suspension units 12 remain in a state with the high amount of damping unless the operator performs a putting-into-gear operation. Thus, for example, when the vehicle is stopped with its engine idling or is stopped by Adaptive Cruise Control, the amount of damping within the front suspension units 11 and the rear suspension units 12 is prevented from changing if the operator does not intend to change it.

The above-described first example of processing will be described more specifically below with reference to FIG. 2.

Figure 2:
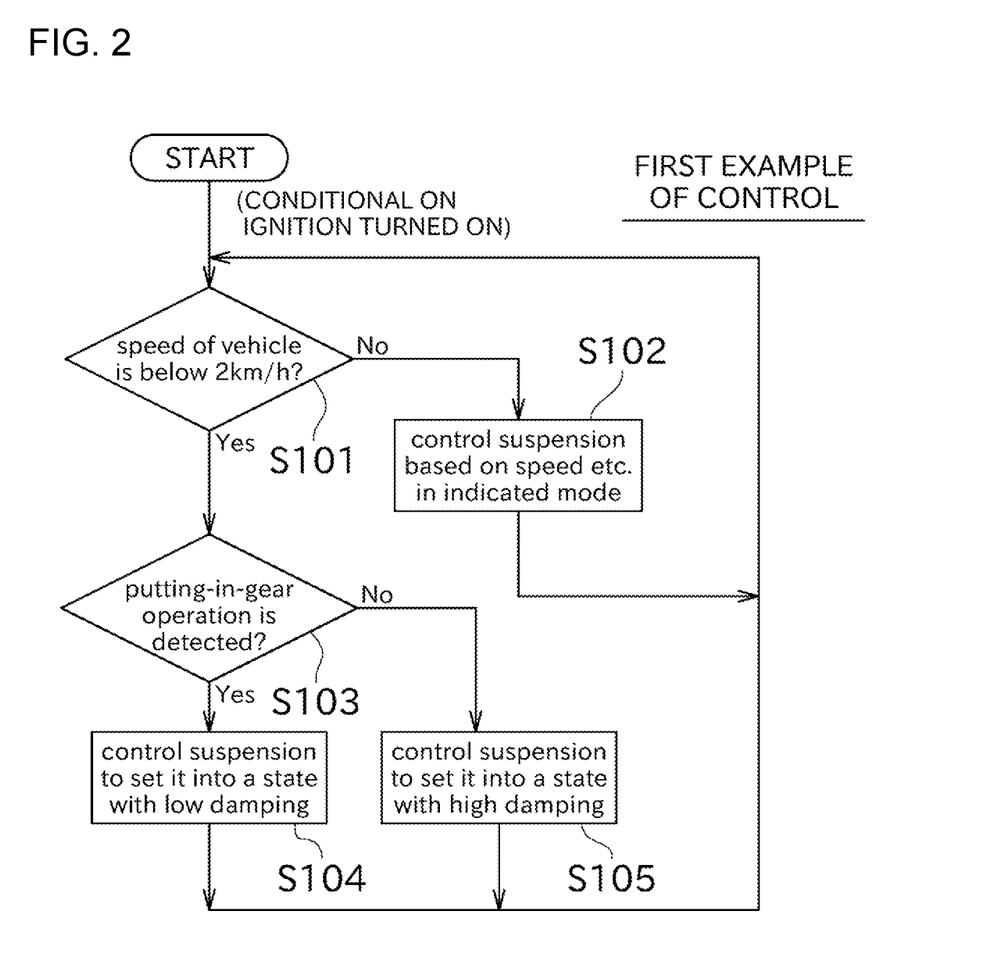
FIG. 2 is a process flowchart illustrating a first example of a control method of front suspension units and rear suspension units.

When the process illustrated in FIG. 2 is started, firstly, the suspension ECU 21 checks whether the speed of the vehicle is below a predetermined threshold or not (step S101).

If the speed of the vehicle is above the threshold, the suspension ECU 21 controls the front suspension units 11 and the rear suspension units 12 based on output from the vehicle speed sensor 36, the IMU 37 and the like and according to the mode indicated by the mode selector switch 31 (step S102). Then the process returns to step S101.

If the speed of the vehicle is determined to be below the predetermined threshold at step S101, the suspension ECU 21 checks whether the operator is performing a putting-into-gear operation or not based on output from the shift sensor 35 (step S103).

If a putting-into-gear operation is detected, the suspension ECU 21 controls the front suspension units 11 and the rear suspension units 12 so that they operate with a low amount of damping, in fact, with a minimum amount of damping regardless of the position of the mode selector switch 31 (step S104). Then the process returns to step S101.

If any putting-into-gear operation is not detected, the suspension ECU 21 controls the front suspension units 11 and the rear suspension units 12 so that they operate with a high amount of damping, in fact, with a maximum amount of damping regardless of the position of the mode selector switch 31 (step S105). Then the process returns to step S101.

Throughout the above-described process, when the vehicle is not in motion, the amount of damping within the front suspension units 11 and the rear suspension units 12 is maintained at the maximum unless the operator performs a putting-into-gear operation (step S105). As explained above, when the amount of damping is at the maximum, no current passes through the solenoids of the solenoid valves 17. Thus, power consumption can be curbed. When the operator performs a putting-into-gear operation, the suspension ECU 21 controls the front suspension units 11 and the rear suspension units 12 so that they operate with the minimum amount of damping regardless of the position of the mode selector switch 31 (step S104).

Figure 3:
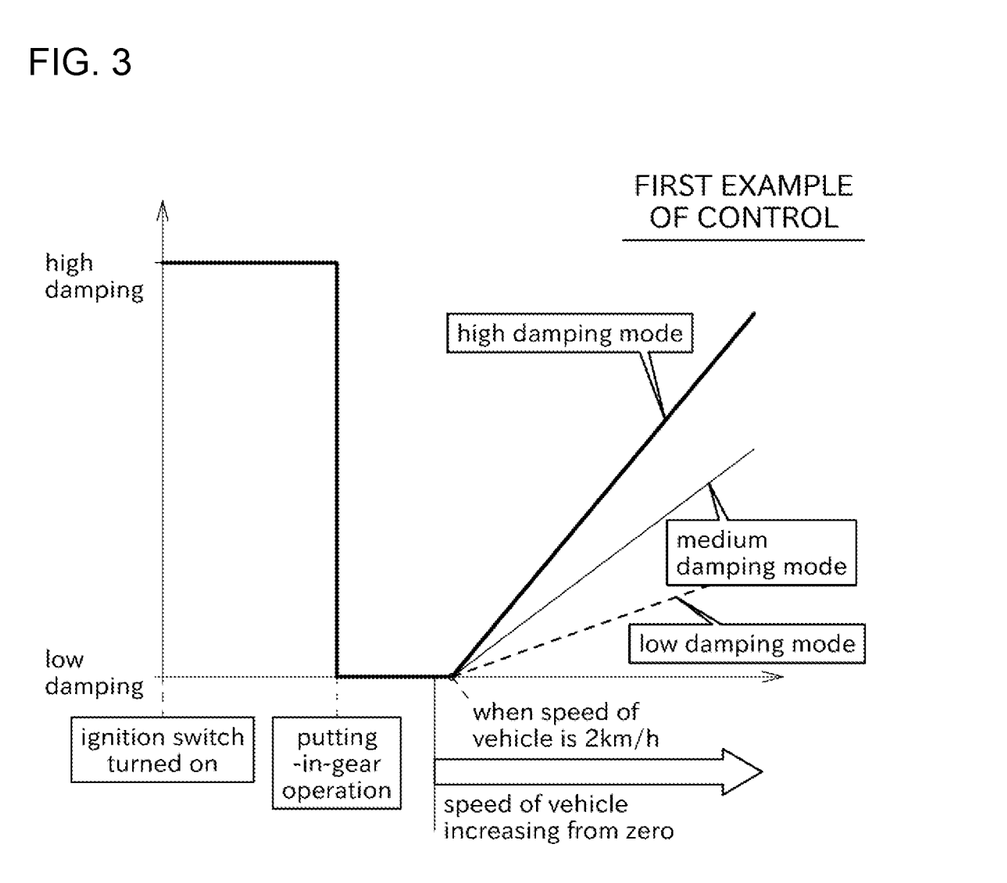
FIG. 3 is a graph illustrating the first example of the control method.

A graph illustrating the above-described control is shown in FIG. 3. As shown in this graph, the amount of damping within the suspension remains at the maximum between the times when the ignition switch is operated to be ON and when a putting-into-gear operation is performed regardless of which mode is selected from the three. The amount of damping within the suspension remains at the minimum between the times when the putting-into-gear operation is performed and when the speed of the vehicle reaches 2 km/h.

Next, a second example will be described in details below. Consider, for example, the case where the utility vehicle 1 is display in a showroom for sale. Within the utility vehicle 1, which is a vehicle for display, the ignition switch has already been operated in advance and power is supplied to the electrical components of the vehicle.

A prospective purchaser gets into the vehicle displayed, which is not in motion, and operates the gear stick 33 to put the vehicle in an in-gear state. In this state, the mode of the suspension can be switched as desired by operating the mode selector switch 31. Thus, the prospective purchaser can check how they feels the vehicle behavior in each mode of the suspension by shaking the vehicle from outside or shaking themselves in the seat while changing the modes of the suspension. This mode may be referred to as "the stopped-state suspension checking mode" below. The above-mentioned putting-into-gear operation may be performed in advance by a person other than the prospective purchaser. The stopped-state suspension checking mode can be operated to check the vehicle behavior in each mode as described above not only when considering purchasing, but also after purchase.

Within the utility vehicle 1, a display 38 is arranged on its steering column. The display 38 is an example of a displayer. The display 38 can be configured arbitrarily. For example, a liquid crystal display can be employed. When the vehicle is in the stopped-state suspension checking mode, the suspension ECU can show information on the display 38 indicating that the vehicle is in that mode. This allows operators, including prospective purchasers, to easily check the current status of the vehicle. It is preferable that the display 38 also show information about which of the three modes the suspension are performing in.

The above-described second example of processing will be described more specifically below with reference to FIG. 4.

Figure 4:
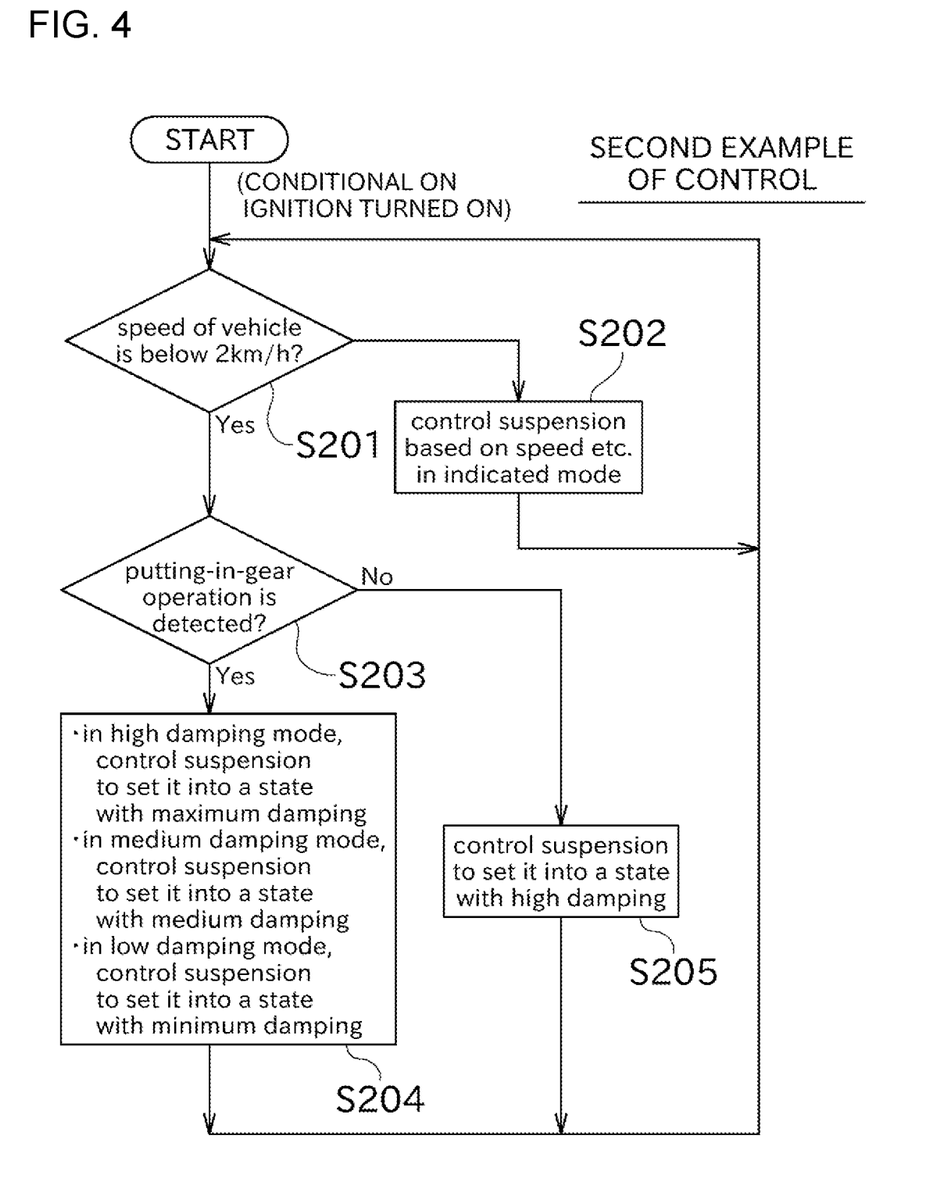
FIG. 4 is a process flowchart illustrating a second example of a control method of the front suspension units and the rear suspension units.

Among the processes illustrated in FIG. 4, steps S201, S202, S203 and S205 are the same as steps S101, S102, S203 and S105 illustrated in FIG. 2, so an explanation of them is omitted.

If a putting-into-gear operation is detected at step S203, the suspension ECU 21 controls the front suspension units 11 and the rear suspension units 12 so that they operate in the mode indicated by operating the mode selector switch 31 (step S204). Then the process returns to step S201.

With this configuration, an operator can actually check the mode of the suspension selected by the mode selector switch 31 when performing a putting-into-gear operation while the vehicle is not in motion.

Figure 5:
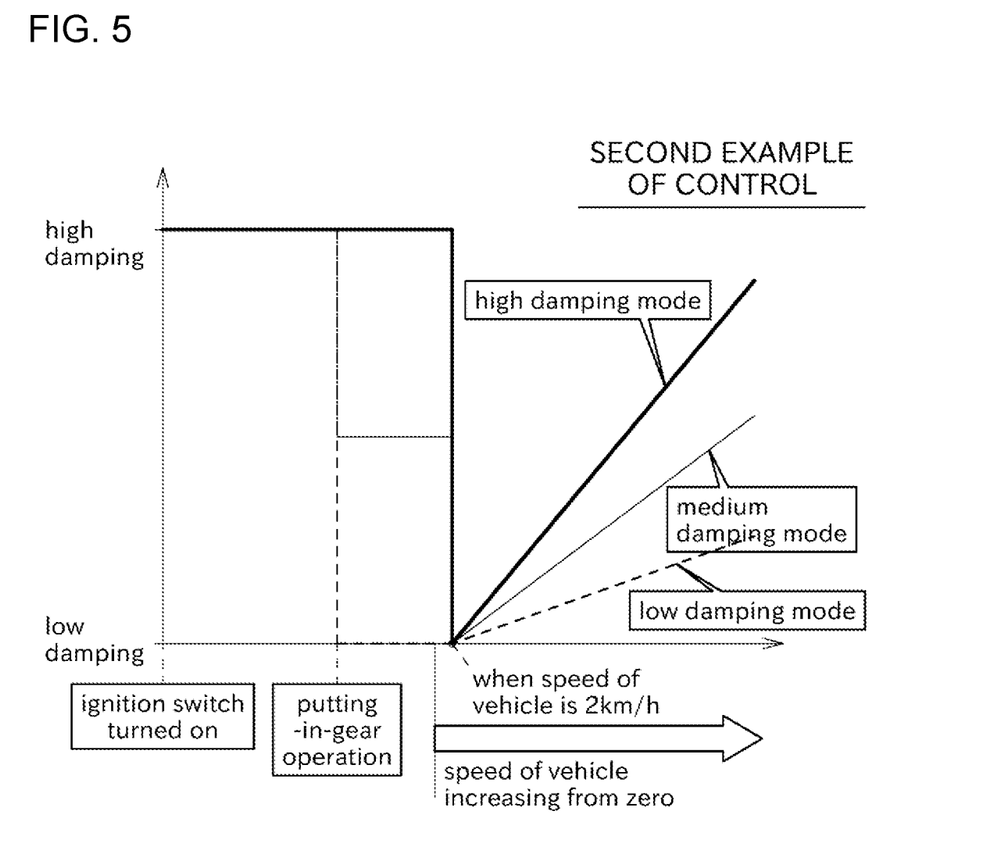
FIG. 5 is a graph illustrating the second example of the control method.

A graph illustrating the above-described control is shown in FIG. 5. As shown in this graph, the amount of damping within the suspension remains at the maximum between the times when the ignition switch is operated to be ON and when a putting-into-gear operation is performed, regardless of which mode is selected from the three. The amount of damping within the suspension are controlled to correspond with the mode selected between the times when the putting-into-gear operation is performed and when the speed of the vehicle reaches 2 km/h. The period of time between when the putting-into-gear operation is performed and when the speed of the vehicle reaches 2 km/h corresponds to the stopped-state suspension checking mode.

In the stopped-state suspension checking mode, the front suspension units 11 and the rear suspension units 12 are controlled to have the characteristics of damping according to each mode as if the vehicle is moving forward at a predetermined speed. Note, however, that in the stopped-state suspension checking mode, the front suspension units 11 and the rear suspension units 12 may operate with setup wherein they operate exaggerating the characteristics of damping compared to the actual characteristics of damping when the vehicle is moving. For example, in the stopped-state suspension checking mode, when the front suspension units 11 and the rear suspension units 12 operate in the low damping mode, the damping force is set to be lower than when the vehicle is moving. On the other hand, when they operate in the high damping mode, the damping force is set to be higher than when the vehicle is moving. Exaggerating the changes in the characteristics of damping according to the mode change makes it easier for an operator to intuitively understand the characteristics of each mode of the suspension. More specifically, in the low damping mode, the amount of damping may be set at the minimum. In the high damping mode, the amount of damping may be set at the maximum. In the medium damping mode, the amount of damping may be set at the median of the minimum and the maximum.

As a variation, the suspension may be configured to return to the high damping state when a predetermined time passes after a putting-into-gear operation performed while the vehicle is not in motion. Although, within the configuration described above, the amount of damping is changed depending on a putting-into-gear operation with the ignition switch on, an ignition operation may be omitted.

As described above, the utility vehicle 1 includes the electronically controlled front suspension units 11, the electronically controlled rear suspension units 12, the shift sensor 35, and the suspension ECU 21. The front suspension units 11 and the rear suspension units 12 are capable of modifying the response characteristics of the behavior of the vehicle. The shift sensor 35 detects a putting-into-gear operation performed by an operator indicating an intention of moving the vehicle. Within the first example illustrated in FIG. 2, the suspension ECU 21 changes the response characteristics of the vehicle behavior when the shift sensor 35 detects an operator's putting-into-gear operation (step S104) to make them different from when the shift sensor 35 detects no putting-into-gear operations of the operator (step S105).

This allows changing the response characteristics of the vehicle behavior into that which is suitable for the vehicle to start moving when a putting-into-gear operation, that is, an operation performed by an operator to move the vehicle, is detected. In other words, as long as any putting-into-gear operation of an operator is not detected, the response characteristics of the vehicle behavior is prevented from changing into that is appropriate for the vehicle to start moving. Thus, unintentional changes in the characteristics of the vehicle behavior are prevented from occurring while an operator is in the vehicle and doesn't intend to move it. In addition, since the response characteristics of the vehicle behavior can be configured differently, one suitable while it is not in motion and one suitable when it starts to move, the response characteristics of the vehicle behavior can be adjusted corresponding to each situation. Changing the characteristics of the behavior appropriate for the vehicle to start moving when a putting-into-gear operation is detected makes it easier to modify the characteristics of the behavior suitable for staring to move before the vehicle actually starts to move. Within the present embodiment, a putting-into-gear operation is detected as one example of operations indicating an intention of moving the vehicle. Other operations performed for moving the vehicle may be also be detected as an operation indicating an intention of moving it. For example, an operation of releasing a parking brake, fastening a seat belt, or pressing on an accelerator may be determined as a condition, indicating an intention of moving the vehicle, for changing the response characteristics of the vehicle behavior. Each of these operations can also correspond to an intention of starting the vehicle, since they are operations performed based on an operator's intention of starting the vehicle. Within the present embodiment, the amount of damping of suspension is described as an example of the vehicle behavior responding to external force, but they are not limited to it. For example, stroke length of the shock absorbers and initial position thereof may also be changed. Also, as the vehicle behavior other than the operation of the suspension, the operation of a stabilizer may be changed. It is preferable that such vehicle behavior needs to be different when the vehicle is in motion compared to when it is not. The change in the vehicle behavior responding to external force may be occurred by an electronic control device that is configured to curb power consumption when the vehicle is not moving and to consume more power when the vehicle is moving than when it is not in motion.

Within the utility vehicle 1 of the present embodiment, the shift sensor 35 detects a putting-into-gear operation performed by an operator. A putting-into-gear operation, which is a condition for the suspension ECU 21 to start a controlling process to change the response characteristics of the vehicle behavior, is an operation for moving the vehicle performed after an ignition operation that supplies electric power to electrical components of the vehicle.

Detecting an operation for moving the vehicle performed by an operator after an ignition operation, as described, provides high accuracy in detecting the operator's intention of moving the vehicle.

Within the utility vehicle 1 of the present embodiment, a putting-into-gear operation that is a condition for the suspension ECU 21 to start a controlling process to change the response characteristics of the vehicle behavior, is a putting-into-gear operation performed under a condition where electric power has started being supplied to electrical components of the vehicle.

An operator's intention of moving the vehicle can be detected earlier and the response characteristics of the vehicle behavior can be adjusted earlier compared to when an operation of pressing on an accelerator is detected instead of a putting-into-gear operation, since a putting-into-gear operation is to be performed before an operation for accelerating the vehicle. Conditioning the controlling process on a putting-into-gear operation makes it easier to prevent a false detection of an intention of moving the vehicle, since a putting-into-gear operation is not performed when there is no intentions of moving it.

Within the first example illustrated in FIG. 2, when the shift sensor 35 detects an operator's putting-into-gear operation (step S104), the suspension ECU 21 changes the response characteristics of the vehicle behavior so that the power consumption becomes higher than when the shift sensor 35 doesn't detect any putting-into-gear operations of the operator (step S105). In other words, when any intention of moving the vehicle is not detected, the response characteristics of the vehicle behavior is adjusted to make the power consumption low. When an intention of moving the vehicle is not detected, i.e., when the vehicle is not moving, changing the response characteristics of the behavior compared to when the vehicle is moving doesn't affect driving performance and power consumption can be appropriately reduced.

In this manner, while the vehicle is not moving, power consumption can be reduced until an operation indicating an intention of moving the vehicle is detected.

Within the first example illustrated in FIG. 2, when the shift sensor 35 detects an operator's putting-into-gear operation (step S104), the suspension ECU 21 changes the response characteristics of the vehicle behavior so that the behavior of the vehicle responding to external force becomes more drastic compared to when the shift sensor 35 doesn't detect any putting-into-gear operation of the operator (step S105).

In this manner, while the vehicle is not in motion, the behavior characteristics can be prevented from changing until a putting-into-gear operation is detected. For example, this makes it easier to prevent the vehicle body from bouncing when the vehicle is not moving and a possibility of contact between the vehicle and obstacles around the vehicle body can be reduced.

Within the utility vehicle 1 of the present embodiment, the front suspension units 11 and the rear suspension units 12 are configured to be capable of operating in multiple modes with different response characteristics of the vehicle behavior. Furthermore, the utility vehicle 1 includes the mode selector switch 31 that is operated to select and indicate a mode of the front suspension units 11 and the rear suspension units 12. Within the second example illustrated in FIG. 4, when the shift sensor 35 detects a putting-into-gear operation performed by an operator, the suspension ECU 21 controls the front suspension units 11 and the rear suspension units 12 so that they operate according to the mode selected and indicated by the mode selector switch 31 (step S204).

In this manner, when a putting-into-gear operation indicating an intention of moving vehicle is detected, the response characteristics of the behavior of the utility vehicle 1 is changed into that in the mode selected and indicated. In other words, as long as any putting-into-gear operation of an operator is not detected, the response characteristics of the vehicle behavior is prevented from changing even if the operator operates the mode selector switch 31 to change modes. As described above, since detection of a putting-into-gear operation, that is, a predetermined specific operation of an operator, is required to change modes, an unintentional mode change under a condition where an operator in the vehicle operates the mode selector switch can be prevented.

The utility vehicle 1 of the present embodiment includes the shift sensor 35 that detects a putting-into-gear operation. A putting-into-gear operation is a predetermined operation performed by an operator after an ignition operation supplying electric power to the electrical components of the vehicle. Within the second example illustrated in FIG. 4, when the shift sensor detects a putting-into-gear operation performed by an operator, the suspension ECU 21 controls the front suspension units 11 and the rear suspension units 12 so that the operate with the characteristics of the behavior corresponding to the mode indicated by the mode selector switch 31 (step S204).

In this manner, an observer can see the difference in vehicle behavior according to the selected mode by performing a putting-into-gear operation even when the vehicle is not moving. Within the present embodiment, a putting-into-gear operation is employed as a predetermined operation required for changing the characteristics of the vehicle behavior while the vehicle is not in motion, but it is not limited to it. Specifically, other operations may be employed if they are not frequently operated while the vehicle is not moving. For example, an operation of multiple switches on the vehicle may be set as a predetermined specific operation.

Within the utility vehicle 1 of the present embodiment, the suspension ECU 21 may control the front suspension units 11 and the rear suspension units 12 to make the differences between the response characteristics of the vehicle behavior according to each of the said modes greater when the vehicle is not in motion than when it is moving.

In this case, exaggerating the changes in the response characteristics of the behavior according to the changes in modes makes it easier for an observer to understand the differences between modes.

Within the utility vehicle 1 of the present embodiment, detection of a specific operation with respect to the vehicle is achieved by the shift sensor 35 detecting a putting-into-gear operation that is performed after an ignition operation wherein an operation supplying electric power to electrical components of the vehicle is detected.

In this manner, the configuration for detection can be used concurrently, which improves operability of the vehicle and simplifies the structure.

Within the utility vehicle 1 of the present embodiment, when the vehicle is not in motion and no putting-into-gear operation is detected, the suspension ECU 21 controls the front suspension units 11 and the rear suspension units 12 so that they operate in the high damping mode, which is a mode with zero or the lowest power consumption among all modes, regardless of which mode the mode selector switch 31 indicates.

This allows power consumption within the front suspension units 11 and the rear suspension units 12 to be reduced.

The utility vehicle 1 of the present embodiment includes the display 38. When the vehicle is not moving, the suspension ECU 21 changes information shown on the display 38 about the operation of the front suspension units 11 and the rear suspension units 12 depending on whether a putting-into-gear operation is detected or not. Specifically, when a putting-into-gear operation is detected, information indicating the vehicle is in the stopped-state suspension checking mode appears on the display 38. When no putting-into-gear operation is detected, the information indicating the vehicle is in the stopped-state suspension checking mode does not appear on the display 38.

This allows a person such as a prospective purchaser to easily understand the characteristics of the vehicle behavior.

Within the utility vehicle 1 of the present embodiment, the response characteristics of the vehicle behavior is adjusted by the electronically controlled suspension units, the front suspension units 11 and the rear suspension units 12.

In this manner, the response characteristics of the vehicle behavior provided by suspension can be changed to be suitable for the vehicle to start moving.

Although the preferred embodiments and the modifications of the present disclosure have been described above, the configurations described above may be modified as follows, for example. Such a modification may be made singularly or made in combination with any other modifications.

A condition for changing the response characteristics of the vehicle behavior may be a combination of two or more operations, not just one. This can improve the accuracy of detection of an intention of moving the vehicle. In terms of preventing an unintentional change in behavior, an operation selecting a mode to select an amount of damping may be excluded from operations considered to indicate an intention of moving the vehicle.

The control of the front suspension units 11 and the rear suspension units 12 may be performed by a computer other than the suspension ECU 21. For example, an engine ECU, which is not shown in the drawings, may be modified to be configured to control the suspension.

Modes of an electronically controlled stabilize may be controlled to adjust the response characteristics of the vehicle behavior instead of that of an electronically controlled suspension. In the high damping mode, a small current may pass through the solenoids of the solenoid valves 17.

The amount of current passes through the solenoid valves 17 may be highest in the high damping mode and lowest in the low damping mode, which is contrary to the embodiment described above. In this case, in terms of reducing power consumption, it is preferable that the vehicle remains in a state with a low amount of damping when it is not moving.

The damping characteristics of the front suspension units 11 and the rear suspension units 12 may be changed simply by varying the amount of current passes through the solenoids. In this case, the front suspension units 11, the rear suspension units 12, and the suspension ECU 21 do not have to be provided with any modes.

Within the description of the embodiment above, setting a state where the speed of the vehicle is less than a threshold as a condition is described as an example of ways of judging whether the vehicle is moving or not, but it is not limited to this. For example, an apparatus that detects a position of an object using radio waves, such as GNSS, may be used for judging whether the vehicle is moving. Also, detection results of acceleration changes output from a gyroscope sensor may be used for judging whether the vehicle is moving. In addition, in order to judge whether the vehicle is moving, detected values that vary depending on the travel motion of the vehicle, such as frequencies of rotations of the wheels may be used.

A supercharger or a turbocharger may be installed on the engine 8. The drive source is not limited to the engine 8. For example, the vehicle may be motor-driven or may be configured as a hybrid vehicle driven by both a motor and an engine.

The utility vehicle 1 may be configured to hold any occupants and may have just one row of seats or two rows of seats.

To support the front wheels 6 and the rear wheels 7 with respect to the vehicle body 5, known configurations such as trailing arms or A-arms may be employed, but also any other supporting structures may be used.

Functions of the suspension ECU 21 and other elements disclosed within the present disclosure may be executed by using a circuit or a processing circuit comprising a processor or a circuit configured or programmed to execute functions disclosed herein, such as a general-purpose processor, a special purpose processor, an integrated circuit, ASIC (Application Specific Integrated Circuits), a conventional circuit, and/or a combination of them. A processor is considered as a processing circuit or a circuit because it contains a transistor and other circuits. Within the present disclosure, each of a circuit, a unit, or a mean is hardware that executes functions listed herein or hardware programmed to execute functions listed. This hardware may be the hardware disclosed within the present disclosure or may be any other known hardware that is programmed or configured to execute the listed functions. If hardware is a processor, which is considered a type of circuits, a circuit, a mean, or a unit is a combination of hardware and software, and the software is used to configure the hardware and/or the processor.

What is claimed is:

1. A utility vehicle, comprising:
an electronically controlled vehicle behavior adjuster capable of modifying response characteristics of behavior of the utility vehicle;
an intention detector configured to detect at least one of intentions of an operator of moving the utility vehicle; and
a controller configured to change the response characteristics of the behavior of the utility vehicle when an operator's intention of moving the utility vehicle is detected by the intention detector compared to when an intention of the operator of moving the utility vehicle is not detected by the intention detector.

2. The utility vehicle according to claim 1, wherein the intention detector detects at least one of operations for moving the utility vehicle performed by the operator after an ignition operation wherein an operation supplying electric power to electrical components of the utility vehicle is detected.

3. The utility vehicle according to claim 1, wherein the intention detector detects a putting-into-gear operation performed under a condition where electric power has started being supplied to electrical components of the utility vehicle.

4. The utility vehicle according to claim 1, wherein the controller changes the response characteristics of the behavior of the utility vehicle when the intention detector detects an operator's intention of moving the utility vehicle, so that power consumption becomes higher than when the intention detector does not detect any intention of the operator of moving the utility vehicle.

5. The utility vehicle according to claim 1, wherein the controller changes the response characteristics of the behavior of the utility vehicle when the intention detector detects an operator's intention of moving the utility vehicle, so that the behavior of the utility vehicle changes more drastically in response to external force compared to when the intention detector does not detect any intention of the operator of moving the utility vehicle.

6. The utility vehicle according to claim 1, wherein
the vehicle behavior adjuster is configured to be capable of operating in multiple modes with different response characteristics of the behavior of the utility vehicle, and
wherein the utility vehicle comprises a mode switcher configured to be operated to select and indicate one of the modes of the vehicle behavior adjuster, and
wherein the controller controls the vehicle behavior adjuster when the intention detector detects an operator's intention of moving the utility vehicle, so that the vehicle behavior adjuster operates according to a mode selected and indicated by the mode switcher.

7. The utility vehicle according to claim 6, comprising:
a specific operation detector configured to detect a predetermined specific operation performed by an operator after an ignition operation wherein an operation supplying electric power to electrical components of the utility vehicle is detected,
wherein the controller controls the vehicle behavior adjuster, when a speed of the utility vehicle is below a predetermined threshold and the specific operation detector detects a specific operation performed by an operator, so that the vehicle behavior adjuster operates with characteristics of behavior corresponding to a mode indicated by the mode switcher.

8. The utility vehicle according to claim 7, wherein the controller controls the vehicle behavior adjuster to make differences between response characteristics of the behavior of the utility vehicle according to each of the modes greater when the utility vehicle is not in motion than when it is moving.

9. The utility vehicle according to claim 7, wherein the specific operation detector is implemented within the intention detector configured to detect at least one of operations for moving the utility vehicle performed by the operator after an ignition operation wherein an operation supplying electric power to electrical components of the utility vehicle is detected.

10. The utility vehicle according to claim 7, wherein the controller controls the vehicle behavior adjuster, when the utility vehicle is not in motion and the specific operation is not detected, so that the vehicle behavior adjuster operates in a mode among the modes in which zero or a lowest electric power is consumed, regardless of which mode the mode switcher indicates.

11. The utility vehicle according to claim 7, comprising:
a displayer,
wherein the controller changes information shown on the displayer about operation of the vehicle behavior adjuster, when the utility vehicle is not moving, depending on whether a specific operation is detected or not.

12. The utility vehicle according to claim 1, wherein the vehicle behavior adjuster is an electronically controlled suspension.

13. A utility vehicle, comprising:
an electronically controlled vehicle behavior adjuster;
a sensor configured to detect at least one of intentions of an operator of moving the utility vehicle; and
a computer configured to change response characteristics of behavior of the utility vehicle through the vehicle behavior adjuster when an operator's intention of moving the utility vehicle is detected by the sensor, compared to when an intention of the operator of moving the utility vehicle is not detected by the sensor.

14. A utility vehicle, comprising:
an electronically controlled vehicle behavior adjuster capable of operating in multiple modes with different response characteristics of behavior of the utility vehicle;
a sensor configured to detect a predetermined specific operation performed by an operator after an ignition operation wherein an operation supplying electric power to electrical components of the utility vehicle is detected;
a mode switch configured to be operated to select one of the modes of the vehicle behavior adjuster; and
a computer configured to control the vehicle behavior adjuster so that it operates in a mode selected by the mode switch while the utility vehicle is in motion,
wherein the computer controls the vehicle behavior adjuster when the predetermined specific operation is detected by the sensor while the utility vehicle is determined to be not in motion, so that the vehicle behavior adjuster operates according to a mode selected by the mode switch.

* * * * *